(12) United States Patent
Kim et al.

(10) Patent No.: US 7,614,773 B2
(45) Date of Patent: Nov. 10, 2009

(54) LIGHT GUIDE PLATE AND LIQUID CRYSTAL DISPLAY DEVICE HAVING THE SAME

(75) Inventors: Hee Dong Kim, Seoul (KR); Jin Ha Kim, Gyunggi-Do (KR); Jin Jong Kim, Gyunggi-Do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 271 days.

(21) Appl. No.: 11/730,802

(22) Filed: Apr. 4, 2007

(65) Prior Publication Data

US 2008/0031006 A1  Feb. 7, 2008

(30) Foreign Application Priority Data

Apr. 4, 2006  (KR) .................... 10-2006-0030570

(51) Int. Cl.
*F21V 7/04* (2006.01)
(52) U.S. Cl. .................. 362/606; 362/607; 362/617; 362/620
(58) Field of Classification Search .............. 362/606, 362/607, 617–620, 623–626, 600–605, 608–616, 362/330; 349/61–65
See application file for complete search history.

(56) References Cited

U.S. PATENT DOCUMENTS 6,836,303 B2 *  12/2004  Kim .......................... 349/65

7,317,501 B2 *  1/2008  Tanaka et al. ............... 349/112

FOREIGN PATENT DOCUMENTS

| CN | 1321896 A | 11/2001 |
|---|---|---|
| CN | 1438499 A | 8/2003 |
| KR | 2003-0012568 | 2/2003 |

OTHER PUBLICATIONS

Chinese Office Action, with English Translation, issued in Chinese Patent Application No. CN 2007100922610, issued on May 23, 2008.

* cited by examiner

*Primary Examiner*—Bao Q Truong
(74) *Attorney, Agent, or Firm*—McDermott Will & Emery LLP

(57) ABSTRACT

A light guide plate and a liquid crystal display device having the same. The light guide plate is disposed upstream of a liquid crystal panel to refract light supplied through an edge thereof, toward the liquid crystal panel. In the light guide plate, a plate body is disposed at a side of a light source for supplying light when a supply voltage is applied. A plurality of pyramidal diffusing elements are arrayed in a predetermined pattern on a surface of the plate body. Each of the diffusing elements is rotated clockwise or counterclockwise about an axis extending through a vertex of the diffusing element perpendicularly to the surface of the plate body so that an edge of the diffusing element facing a reference line connecting a central point of the light source to a central point of the plate body is angled 10° to 35° about the reference line.

13 Claims, 13 Drawing Sheets

(a)

(b)

(a)

(b)

(a)

(b)

LIGHT GUIDE PLATE AND LIQUID CRYSTAL DISPLAY DEVICE HAVING THE SAME

CLAIM OF PRIORITY

This application claims the benefit of Korean Patent Application No. 2006-30570 filed on Apr. 4, 2006 in the Korean Intellectual Property Office, the disclosure of which is incorporated herein by reference.

BACKGROUND OF THE INVENTION

1. Field of the Invention

The present invention relates to a light guide plate and a liquid crystal display device having the same, more particularly, in which the light guide plate has a function of a diffusing sheet and a prism sheet to remarkably improve brightness of light refracted from the light guide plate toward the liquid crystal panel within a front visual angle, and the number of parts is diminished to reduce thickness of the device and save manufacturing costs.

2. Description of the Related Art

In general, a liquid crystal display device requires a separate light source since a display itself cannot emit light on its own. The light source can be disposed behind the display or at a side thereof.

The light source, when disposed at a side of the display, decreases an overall thickness of the device, thus typically applied to notebook computers or mobile phones having a thin display surface.

FIG. 1 is a configuration view illustrating a conventional liquid crystal display device. A light source 10 such as a fluorescent lamp or a light emitting diode is disposed at a side of a light guide plate 20 in a length direction to emit light generated to a liquid crystal panel 50.

A reflective sheet 25 is disposed under the light guide plate 20 to reflect light toward the liquid crystal panel 50. Additionally, a diffusing sheet 30 is disposed over the light guide plate 20 to diffuse, in several directions, light which is reflected onto the reflective sheet 25, refracted to the light guide plate 20 and exits to the liquid crystal panel 50.

Also, prism sheets 41 and 42 are interposed between the diffusing sheet and the liquid crystal panel 50 to collect light propagating through the diffusing sheet 30 within a front visual angle.

FIG. 2 is a graph illustrating brightness distribution of light propagating through each part of a conventional liquid crystal display device. Brightness distribution of light passing through the light guide plate 20 is indicated with a line 'd1.' Here, brightness is shown to be high at a visual angle of 50° to 70°. On the other hand, brightness is relatively greatly degraded in a front visual angle of 0°.

Moreover, in a case where the diffusing sheet 30 is adopted, brightness distribution of light passing through the light guide plate 20 is indicated with a line 'c1.' Here, the brightness distribution that is biased to one side is shifted toward a front visual angle. In a case where the prism sheets 41 and 42 are disposed in addition to the diffusing sheet 30, brightness distribution of light passing therethrough is completely shifted to a front visual angle as indicated with lines 'b1' and 'a1.' Thus, the brightness distribution is found to be increased at a front angle of ±30°.

As demonstrated by the graph, the light guide plate in the conventional liquid crystal display device has a drawback in brightness distribution that is biased to one side from a front visual angle. To overcome this drawback and achieve a display with a desired image, the diffusing sheet 30 and prism sheets 41 and 42 should be additionally provided. This, however, increases thickness and volume of the liquid crystal display device.

Also, the diffusing sheet 30, and the prism sheets 41 and 42 account for a significant proportion of costs in the liquid crystal display device. This mainly leads to increase in overall manufacturing costs of the liquid crystal display device.

Meanwhile, in a method to enhance directionality and gathering of light refracted from the light guide plate 20, microstructures may be formed on the light guide plate 20 to uniformly refract light generated from the light source 10 toward the light crystal panel. The microstructures can be formed by metal etching, lens formation process or mechanical machining.

Korean Patent Application Publication No. 2003-12568 (published on Feb. 12, 2003) discloses hemispherical or pyramidal elements formed on an underside surface of the light guide plate.

FIG. 3 is a graph illustrating brightness distribution of light propagating through a light guide plate having diffusing elements formed thereon. The brightness distribution of light propagating through the light guide plate with the hemispherical and pyramidal elements thereon is biased to one side (right side in FIG. 3) as indicated with a line 'd2' and a line 'b2.'

Meanwhile, in a case where a diffusing sheet 30, a first prism sheet 41 and a second prism sheet 42 having an array of prisms crossing those of the first prism sheet 41 are additionally disposed over the light guide plate 20 with the hemispherical elements thereon, brightness distribution of light is indicated with a line 'c2.' Moreover, in a case where the diffusing sheet 30 and the horizontal prism sheet 42 are additionally disposed over the light guide plate 20 with the pyramidal elements thereon, brightness distribution of light is indicated with a line 'a2', which is substantially similar to that of 'c2.'

Accordingly, the pyramidal elements, when arrayed on the light guide plate yield more advantageous effects than the hemispherical elements. That is, the pyramidal elements adopted require relatively a fewer number of prism sheets than the hemispherical elements, while ensuring substantially identical brightness at a substantially identical front visual angle.

Furthermore, the pyramidal elements which assure better brightness at a front visual angle than the hemispherical elements as just described, are improved in terms of their array configuration thereby to attain higher and more uniform brightness distribution.

FIGS. 4 (a) and (b) are plan views illustrating various configurations of pyramidal diffusing elements arrayed on a light guide plate. As shown in FIG. 4 (a), the diffusing elements 21 are arrayed on the light guide plate 20 along imaginary lines T connecting vertexes of the pyramidal elements 21, in parallel to a reference line O connecting a central point of a light source 10 to a central point of the light guide plate 20. In the diffusing elements, two edges facing the imaginary lines T are set in parallel with the reference line O. This means that the diffusing elements are rotated 0° about the reference line O. Alternatively, as shown in FIG. 4 (b), each of the diffusing elements 21 is rotated 45° clockwise or counterclockwise about an axis extending through a vertex of the diffusing element perpendicularly to a surface of the body so that an array of the diffusing elements is angled 45° about the reference line O.

FIG. 5 is a graph illustrating brightness distribution of light propagating through light guide plates having pyramidal diffusing elements arrayed at a rotation angle of 0° and pyramidal diffusing elements arrayed at a rotation angle of 45° and hemispherical diffusing elements arrayed thereon, respectively. As shown, a line 'a3' indicates brightness distribution of light passing through the light guide plate having the pyramidal diffusing elements formed at a rotation angle of 0°. A line 'b3' indicates brightness distribution of light passing through the light guide plate having the pyramidal diffusing elements arrayed at a rotation angle of 45°. A line 'c3' indicates brightness distribution of light passing through the light guide plate with the hemispherical diffusing elements thereon, and a diffusing sheet, first and second prism sheets disposed over the light guide plate.

As demonstrated by the graph, to attain the same brightness at a front visual angle as in a case where the light guide plate with hemispherical diffusing elements thereon, and the diffusing sheet and prism sheet are adopted, the light guide plate with the pyramidal diffusing elements thereon also requires the diffusing sheet and prism sheet to be disposed thereover. This increases thickness and weight of an overall device and drives up manufacturing costs.

SUMMARY OF THE INVENTION

The present invention has been made to solve the foregoing problems of the prior art and therefore an aspect of the present invention is to provide a light guide plate which significantly enhances brightness of light emitted to a liquid crystal panel at a front visual angle.

Another aspect of the invention is to provide a liquid crystal display device in which the functions of a diffusing sheet and a prism sheet are incorporated into a light guide plate to noticeably enhance brightness of light refracted from a light guide plate toward a liquid crystal panel at a front visual angle, and the number of parts is diminished to reduce thickness of the device, thereby saving manufacturing costs.

According to an aspect of the invention, the invention provides a light guide plate disposed upstream of a liquid crystal panel to refract light supplied through an edge thereof, toward the liquid crystal panel, the light guide plate including a plate body disposed at a side of a light source for supplying light when a supply voltage is applied; a plurality of pyramidal diffusing elements arrayed in a predetermined pattern on a surface of the plate body, wherein each of the diffusing elements is rotated clockwise or counterclockwise about an axis extending through a vertex of the diffusing element perpendicularly to the surface of the plate body so that an edge of the diffusing element facing a reference line connecting a central point of the light source to a central point of the plate body is angled 10° to 35° about the reference line.

Preferably, the diffusing elements are arrayed symmetrically about the reference line.

Preferably, the diffusing elements define depressions in an outer surface of the plate body which is parallel to the liquid crystal panel.

Preferably, the diffusing elements define protrusions in an outer surface of the plate body which is parallel to the liquid crystal panel.

Preferably, the diffusing elements are arranged in a staggered relation.

According to another aspect of the invention, the invention provides a liquid crystal display device including at least one light source for generating light when a supply voltage is applied; a light guide plate including a plurality of pyramidal diffusing elements arrayed in a predetermined pattern on a surface of the plate body, wherein each of the diffusing elements is rotated clockwise or counterclockwise about an axis extending through a vertex of the diffusing element perpendicularly to the surface of the plate body so that an edge of the diffusing element facing a reference line connecting a central point of the light source to a central point of the plate body is angled 10° to 35° about the reference line, a reflective sheet disposed under the light guide plate to reflect light leaked from the light guide plate; and a liquid crystal panel disposed over the light guide plate.

Preferably, the liquid crystal display device further includes at least one diffusing sheet interposed between the light guide plate and the liquid crystal panel.

Preferably, the liquid crystal display device further includes at least one prism sheet interposed between the light guide plate and the liquid crystal panel.

Preferably, the diffusing elements are arrayed symmetrically about the reference line.

Preferably, the diffusing elements define depressions in an outer surface of the plate body which is parallel to the liquid crystal panel.

Preferably, the diffusing elements define protrusions in an outer surface of the plate body which is parallel to the liquid crystal panel.

Preferably, the diffusing elements are arranged in a staggered relation.

Preferably, the light source comprises at least one point light source provided integrally to an edge of the plate body.

Preferably, the light source comprises at least one point light source provided separately from an edge of the plate body.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
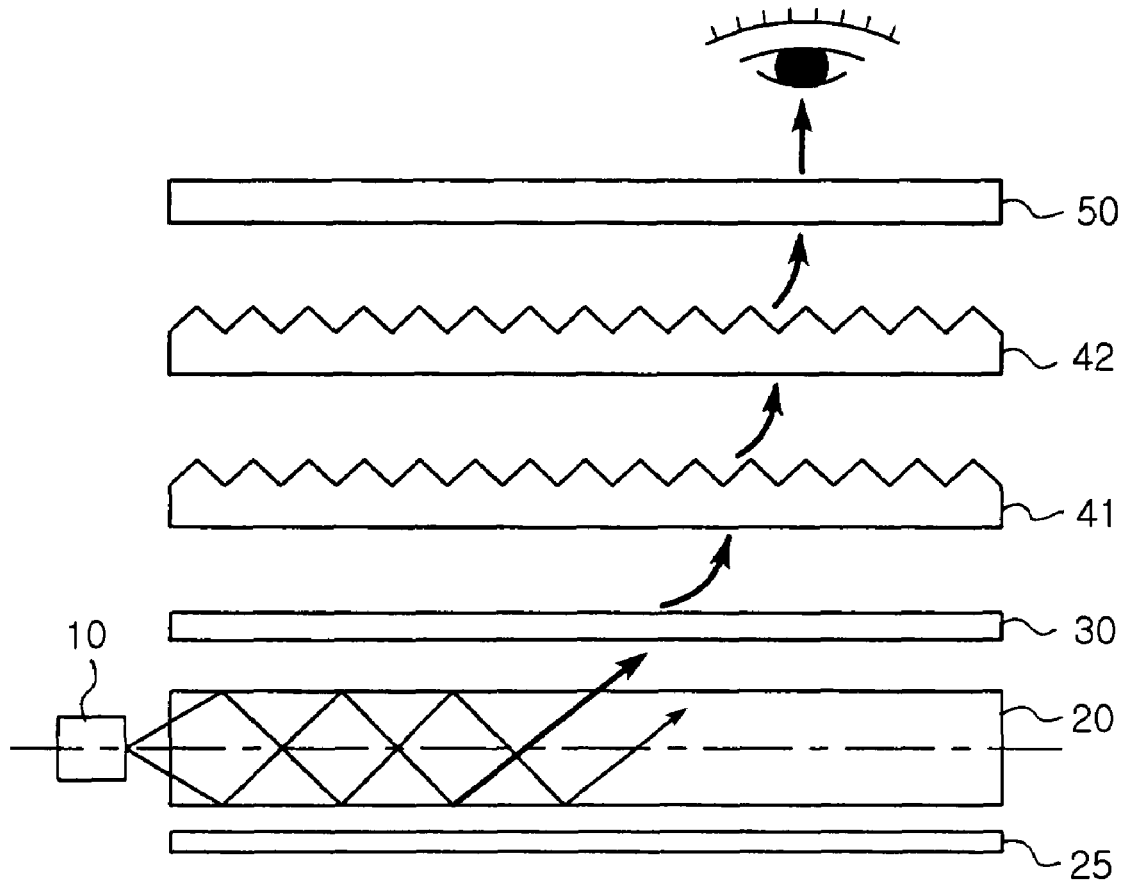
FIG. 1 is a configuration view illustrating a conventional liquid crystal display device.
Figure 2:
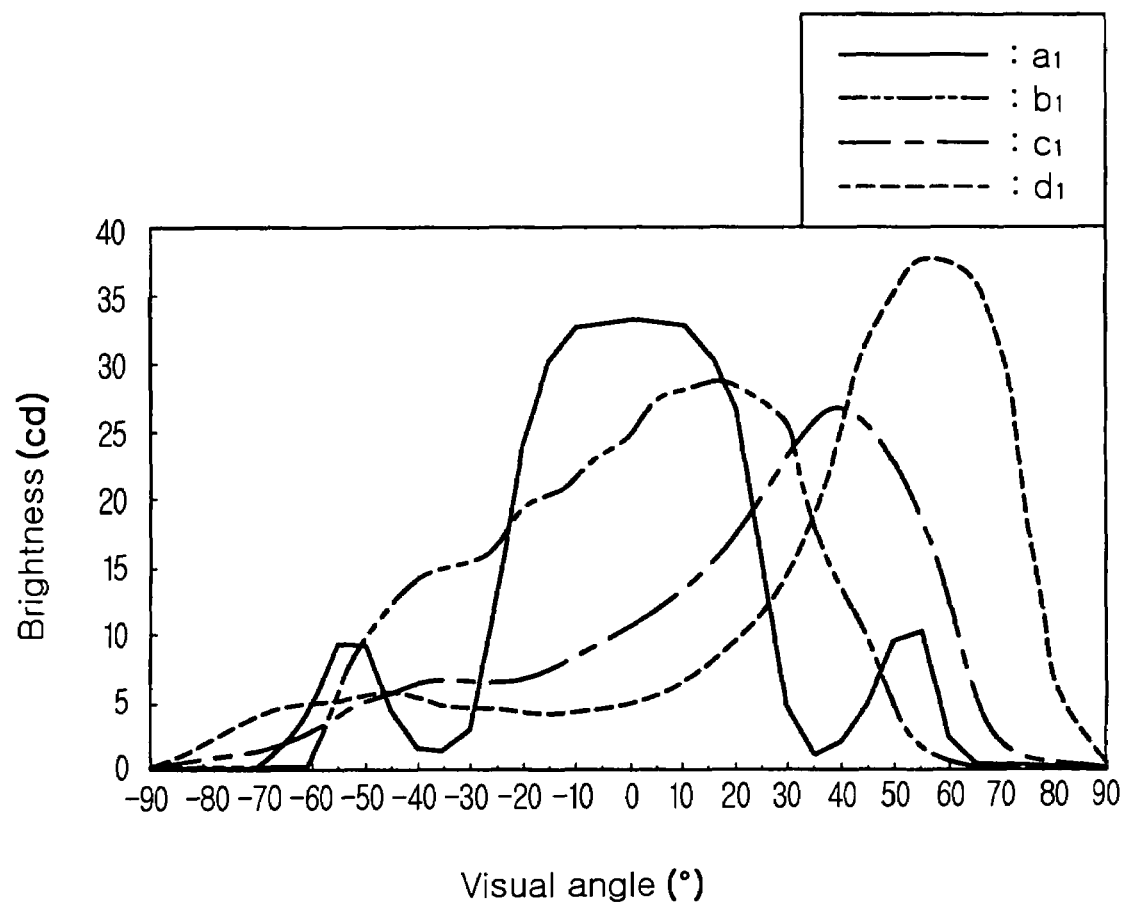
FIG. 2 is a graph illustrating brightness distribution of light passing through each part of a conventional liquid crystal display device.
Figure 3:
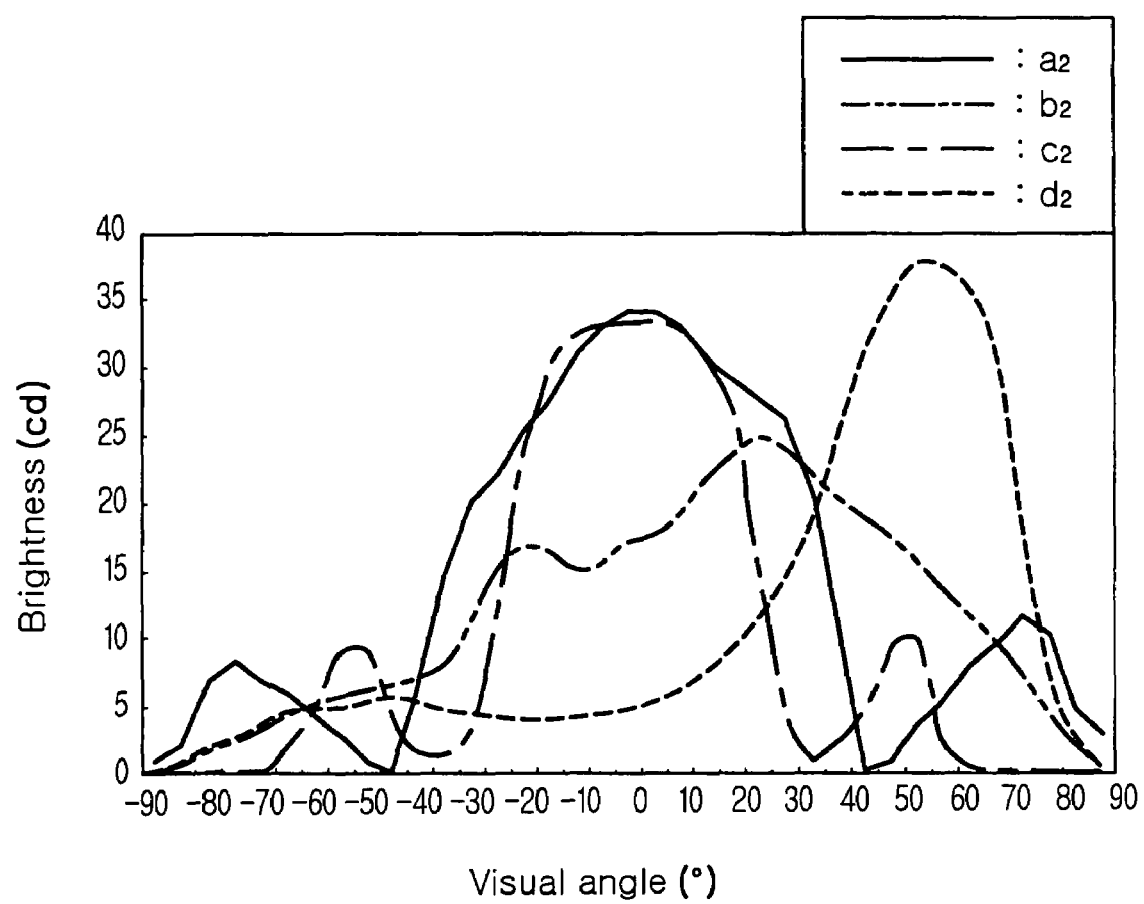
FIG. 3 is a graph illustrating brightness distribution of a light guide plate having diffusing elements arrayed thereon.
Figure 4:
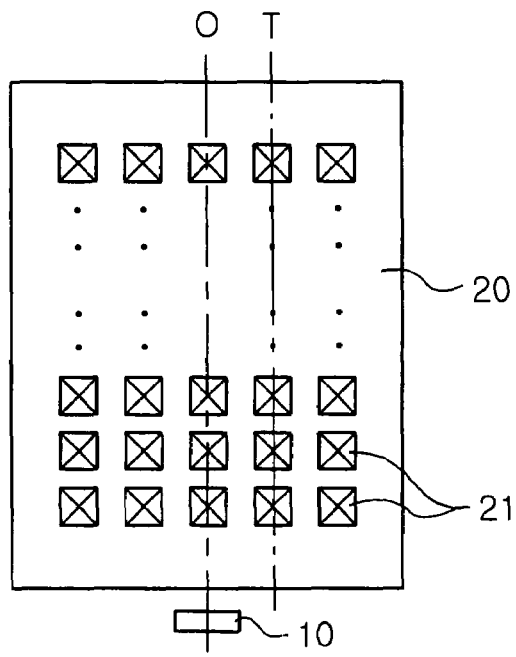
FIGS. 4 (*a*) and (*b*) are plan views illustrating various configurations of pyramidal diffusing elements arrayed on a conventional light guide plate.
Figure 4:
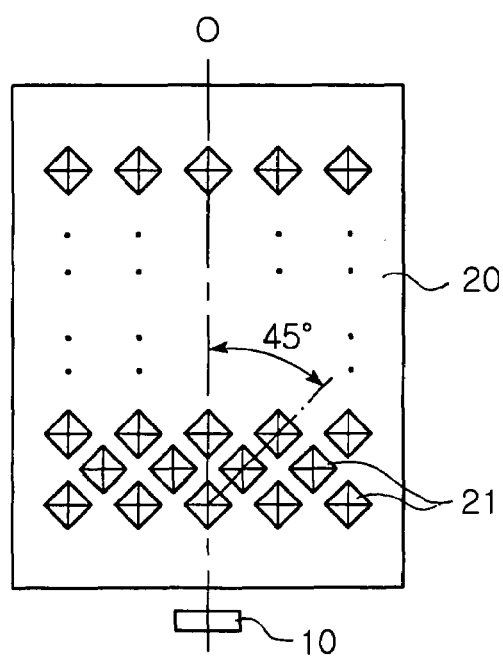
Figure 5:
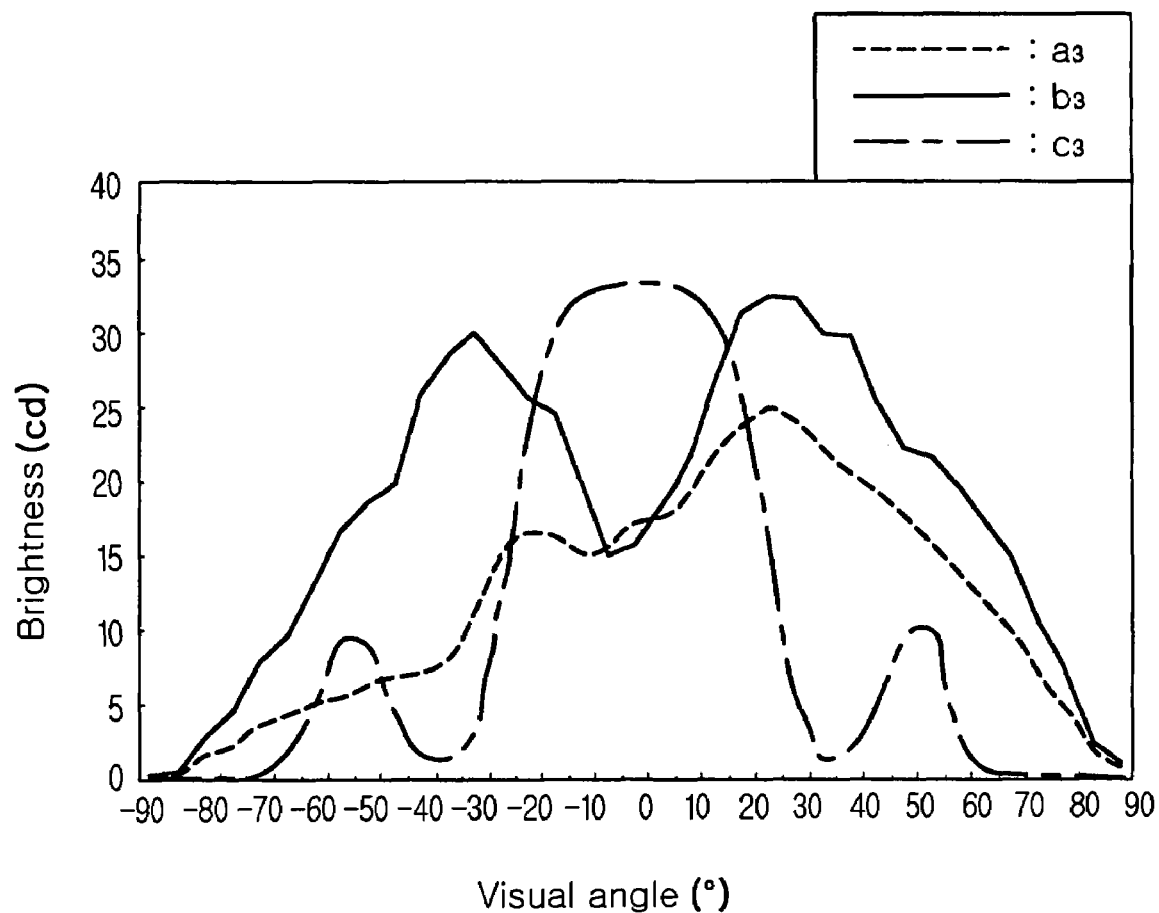
FIG. 5 is a graph illustrating brightness distribution of light propagating through light guide plates having pyramidal diffusing elements arrayed at a rotation angle of 0°, pyramidal diffusing elements arrayed at a rotation angle of 45° and hemispherical diffusing elements arrayed thereon, respectively.
Figure 6:
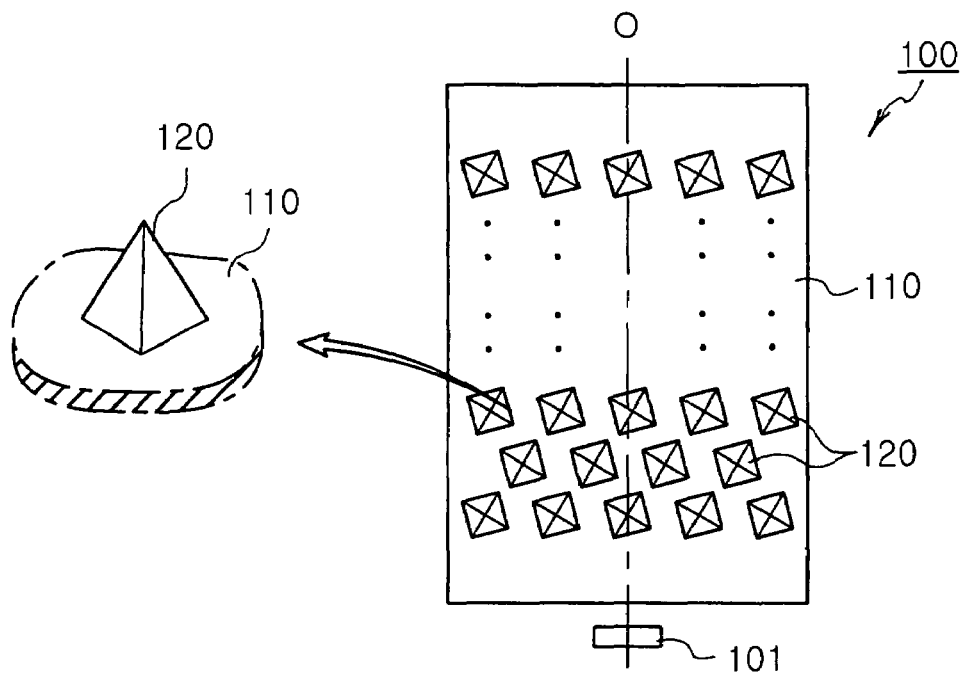
FIGS. 6 (*a*) and (*b*) are plan views illustrating a light guide plate according to a first embodiment of the invention.
Figure 6:
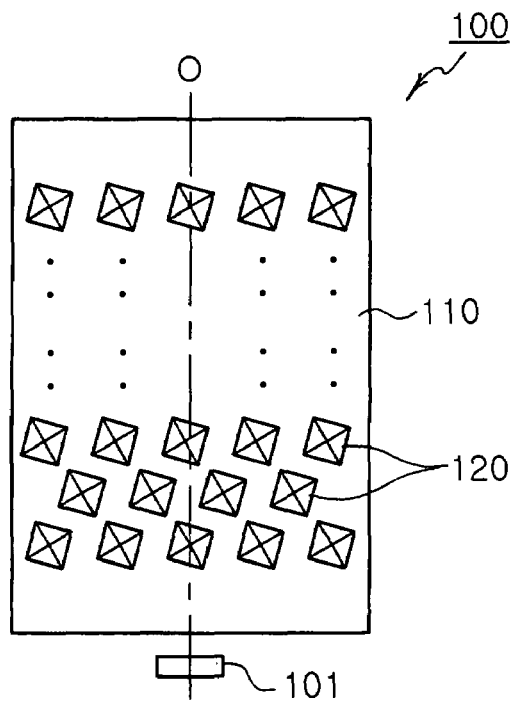

FIGS. 6 (a) and (b) are plan views illustrating a light guide plate according to a first embodiment of the invention. The light guide plate 100 of the invention is disposed upstream of a liquid crystal panel. The light guide plate 100 receives light emitted from a line light source or a point light source through an edge thereof and converts the light to have a surface light source distribution to refract toward the liquid crystal panel. Also, the light guide plate 100 includes a plate body 110 and diffusing elements 120 arrayed on a surface of the plate body 110.

The plate body 110 is disposed at a side of a light source 101 for supplying light when a supply voltage is applied, and made of a rectangular transparent panel.

The light source optionally adopts a fluorescent lamp for generating light having a line light source distribution or a light emitting diode for generating light having a point light source distribution when the supply voltage is applied.

Here, the light source 101 is provided separately from an edge of the plate body 110 to supply light, but the invention is not limited thereto. Alternatively, the light source 101 may be provided integrally to an edge of the plate body 110 to supply light.

Moreover, the diffusing elements 120 are formed to refract, toward the liquid crystal panel, light supplied from the light source 101 or light reflected from the reflective sheet 102 disposed under the light guide plate 110.

The diffusing elements 120 may define pyramidal depressions in an upper surface of the plate body 110 which faces the liquid crystal panel. Alternatively, the diffusing elements 120 may define pyramidal protrusions in an underside surface of the plate body 110 which faces the reflective sheet.

Meanwhile, the diffusing elements 120 feature a pyramidal shape having four inclined surfaces so that some portion of light incident on the plate body 110 is reflected into the plate body or transmitted therethrough, and the remaining portion is refracted toward the liquid crystal panel.

Each of the diffusing elements 120 is rotated clockwise or counterclockwise about an axis extending through a vertex of the diffusing element perpendicularly to a surface of the plate body 110 so that an edge of the diffusing element facing a reference line connecting a central point of the light source to a central point of the plate body is angled 10° to 35° about the reference line O. Here, the four inclined surfaces of the diffusing element meet the vertex. The diffusing elements 120 configured just described serve to enhance refractivity of light refracted toward the liquid crystal panel 150.

As described above, the diffusing elements 120 are rotated clockwise or counterclockwise about the axis perpendicular to the surface of the plate body 110 so that an edge of the diffusing element facing the reference line O is angled 10° to 35° about the reference line O. Here, the diffusing elements 120 are arrayed in a plurality of rows at uniform intervals along a length direction.

Preferably, the diffusing elements 120 are arranged in a staggered relation. This allows light incident into the plate body 110 to be refracted toward the liquid crystal panel at a greater amount, thereby increasing brightness.

As shown in FIG. 6 (a), in a case where the diffusing elements 120 of the plate body 110 are rotated counterclockwise so that an edge of the diffusing element facing the reference line is angled 10° to 35° about the reference line O, a majority of light incident into the plate body 110 travels toward a front visual angle due to refractivity and internal total reflection. Meanwhile, other portion of light is reflected from an incident face of the diffusing elements 120 to travel toward a side of the plate body 110.

Also, as shown in FIG. 6 (b), in a case where each of the diffusing elements 120 of the plate body 110 is rotated clockwise so that an edge of the diffusing element facing the reference line is angled 10° to 35°, in the same manner as described above, a majority of light incident into the plate body 110 travels toward a front visual angle due to refraction and internal total reflection. Also, other portion of light is reflected from an incident face of the diffusing element 120 to travel toward the side of the plate body 110.

FIGS. 7(a) and (b) are plan views illustrating a light guide plate according to a second embodiment of the invention. Each of diffusing elements 120 is rotated clockwise or counterclockwise so that an edge of the diffusing element facing a reference line O is angled 10° to 35° about the reference line O. Here, the diffusing elements 120 are arrayed symmetrically about the reference line O.

Figure 7:
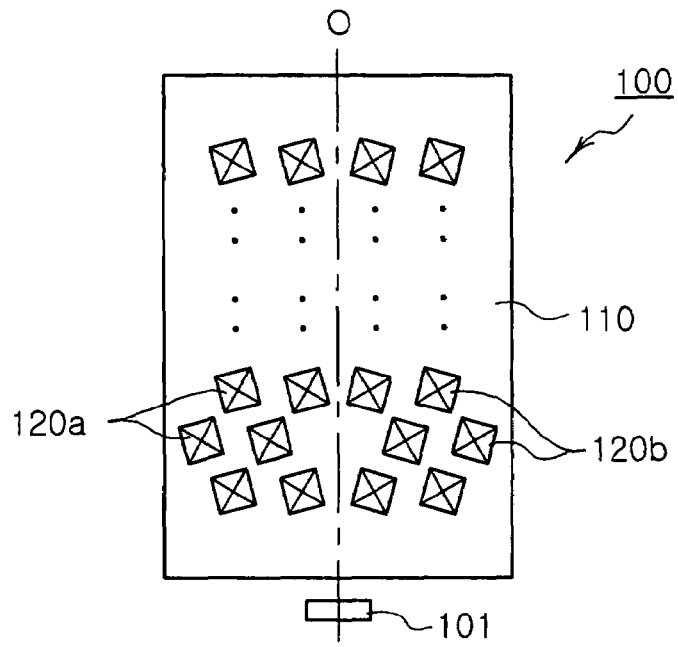
FIGS. 7 (*a*) and (*b*) are plan views illustrating a light guide plate according to a second embodiment of the invention.
Figure 7:
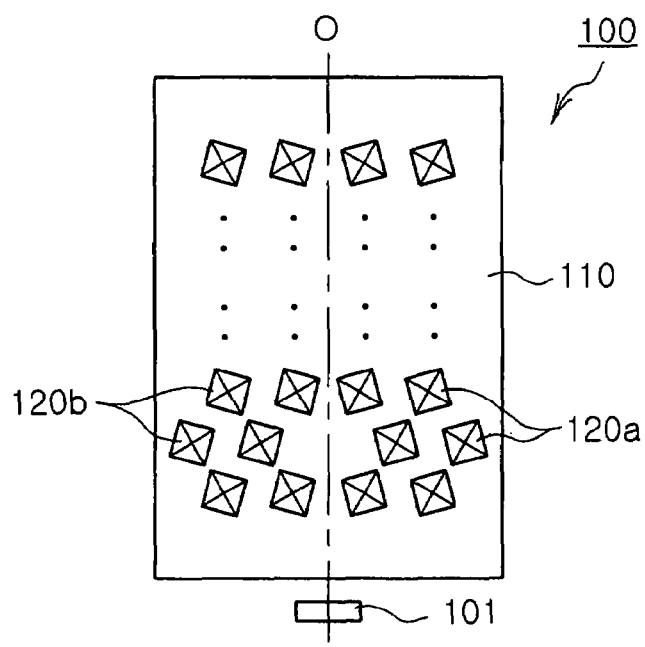

That is, as depicted in a left side of FIG. 7(a), the diffusing elements 120a are rotated counterclockwise so that an edge of the diffusing element facing the reference line is angled 10° to 35°. Also, as depicted in a right side of FIG. 7 (a), the diffusing elements 120b are rotated clockwise so that an edge of the diffusing element facing the reference line is angled 10° to 35°.

Alternatively, contrary to FIG. 7(a), as shown in a left side of FIG. 7 (b), the diffusing elements 120b may be rotated clockwise so that an edge of the diffusing element facing the reference line O is angled 10° to 35°. Meanwhile, as shown in a right side of FIG. 7(b), the diffusing elements 120a may be rotated counterclockwise so that an edge of the diffusing element facing the reference line O is angled 10° to 35°.

Here, the diffusing elements 120a and 120b can be arrayed symmetrically about the reference line O using two silicon wafers as the plate body 110.

Figure 8:
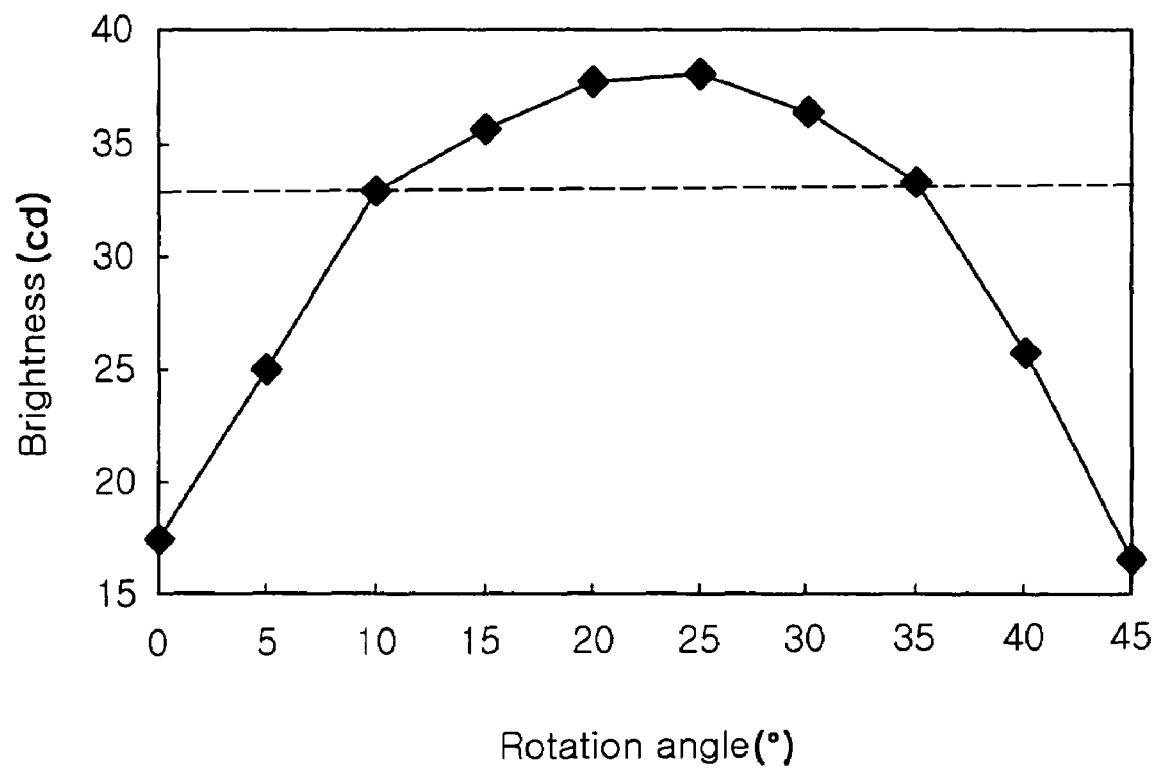
FIG. 8 is a graph illustrating brightness distribution of light propagating through a light guide plate depending on a rotation angle of diffusing elements.

Furthermore, the diffusing elements 120a and 120b can be rotated clockwise or counterclockwise so that an edge of the diffusing element facing the reference line O is angled variously. FIG. 8 is a graph illustrating change in brightness distribution at a front visual angle in accordance with change in the angle.

As shown in the graph of FIG. 8, brightness of light passing through the light guide plate with hemispherical elements thereon, the diffusing sheet and the prism sheet, when measured, is found to be uniform with about 33 CD at a front visual angle, i.e., from 0° to 45° as indicated with a dotted line.

Meanwhile, FIG. 8 illustrates measurement of brightness distribution of light passing through the light guide plate with the pyramidal diffusing elements 120 thereon as indicated with a solid line, without employing the diffusing and prism sheets. Here, each of the pyramidal diffusing elements 120 is rotated so that an edge of the diffusing element facing the reference line is angled 0° to 45°. As seen, the brightness distribution of light at a front visual angle is found to be the same or higher when the diffusing elements 120 are rotated so that an edge of the diffusing element facing the reference line is angled 10° to 35°.

Accordingly, preferably, the diffusing elements 120 are rotated clockwise or counterclockwise so that an edge of the diffusing element facing the reference line O is angled 10° to 35°.

Figure 9:
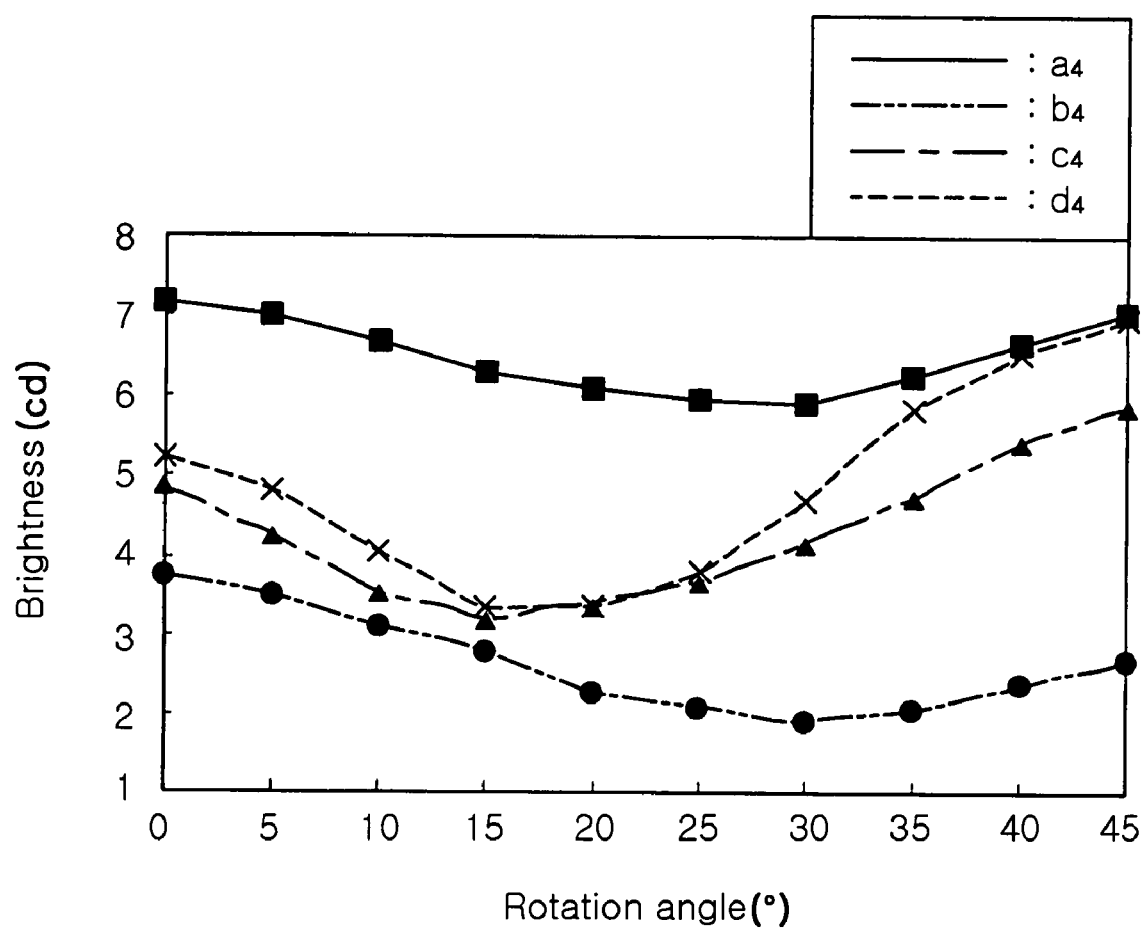
FIG. 9 is a graph illustrating brightness distribution of light at visual angles other than a front visual angle.

FIG. 9 is a graph illustrating brightness distribution at visual angles other than a front visual angle, i.e., light loss resulting from deviation from a front visual angle which is necessarily experienced in a liquid crystal display device.

In FIG. 9, a line 'a4' indicates brightness distribution of light measured after passing through the diffusing elements, i.e., from an exiting face. A line 'b4' indicates brightness distribution of light measured before passing through the diffusing elements, i.e., from an incidence face. A line 'c4' represents brightness distribution of light measured from a left side of the light guide plate. Also, a line 'd4' indicates brightness distribution of light measured from a right side of the light guide plate.

Accordingly, as shown in lines 'a4' to 'd4' of FIG. 9, high brightness is attained at visual angles other than a front visual angle when the diffusing elements are rotated so that an edge of the diffusing element facing the reference line is angled 0° and 45°, thus entailing great light loss. On the other hand, relatively low brightness is attained at visual angles other than a front visual angle when the diffusing elements are rotated so that an edge of the diffusing element facing the reference line is angled 22.25°, thus entailing low light loss.

That is, in a case where the diffusing elements 120 are rotated so that an edge of the diffusing element facing the reference line is angled 10° to 35° in the vicinity of 22.25°, light suffers less loss in an exiting face, an incidence face and a side face, which correspond to non-front visual angles. This as a result relatively increases brightness within a front visual angle as shown in FIG. 8.

In contrast, in a case where the diffusing elements 120 are rotated so that an edge of the diffusing element facing the reference line is angled 0° to 45°, light suffers more loss in an exiting face, an incidence face and a side face, which correspond to non-front visual angles. This as a result relatively decreases brightness within a front visual angle.

Moreover, when the diffusing elements 120 rotated in the manner described above, are arrayed symmetrically about the reference line O, light incident on the diffusing elements 120 suffers less loss when reflected from the diffusing elements 120 and traveling sideboard. Such light is refracted and internally total reflected in the diffusing elements 120, thereby allowing more light to travel toward a front visual angle.

Figure 10:
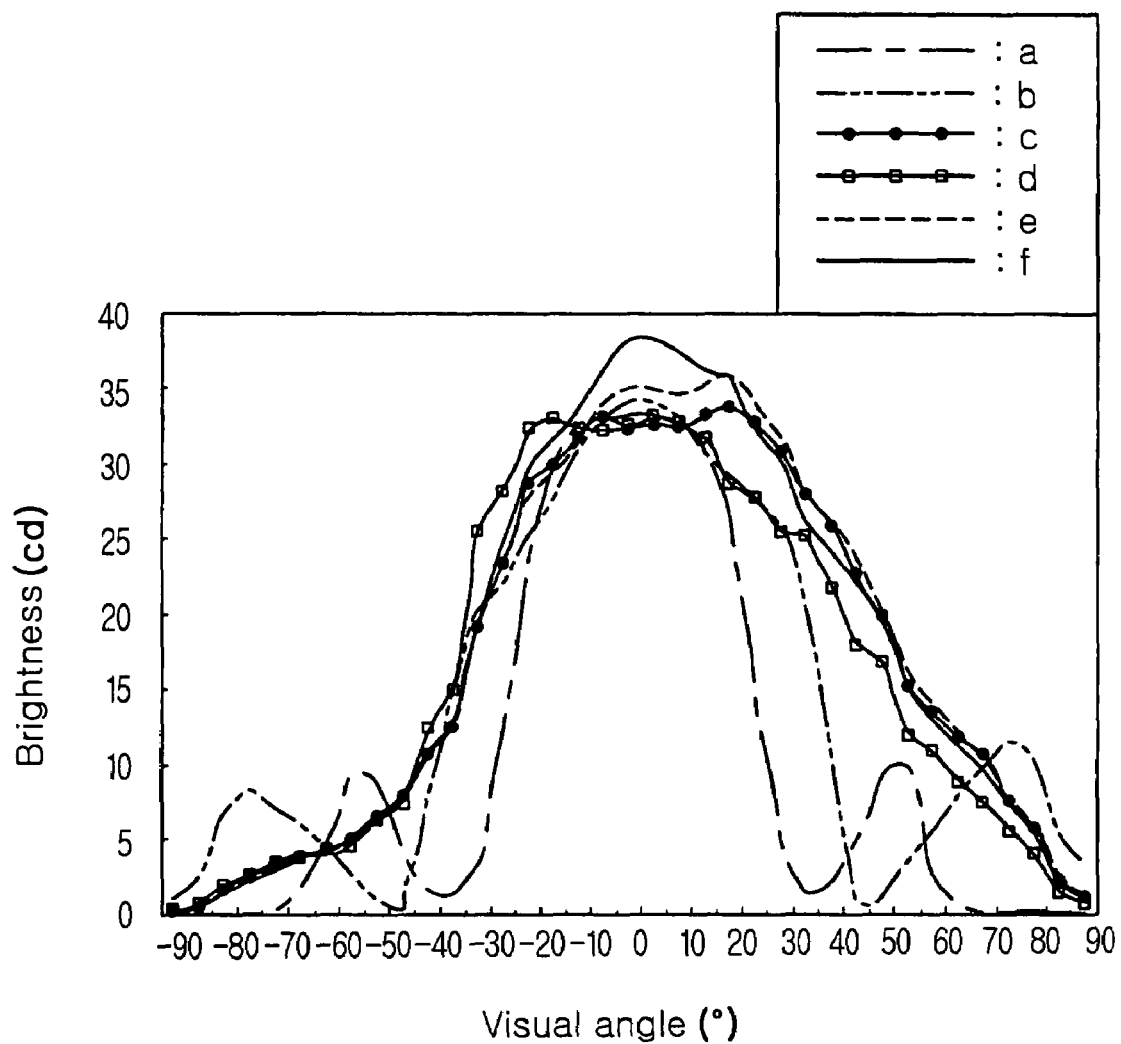
FIG. 10 is a graph illustrating brightness distribution of light emitted from a light guide plate having variously-shaped diffusing elements arrayed thereon.

FIG. 10 is a graph illustrating brightness distribution of light emitted from the light guide plate having variously-shaped diffusing elements arrayed thereon.

In FIG. 10, a line 'a' indicates brightness distribution of light when the light guide plate with the diffusing elements thereon, the diffusing sheet and the first and second prism sheets are adopted. A line 'b' represents brightness distribution when pyramidal diffusing elements are arrayed at a rotation angle of 0° on the light guide plate and the diffusing sheet and the horizontal prism sheet are employed. A line 'c' and a line 'd' represent brightness distribution when the pyramidal diffusing elements 120 of the light guide plate are rotated so that an edge of the diffusing element facing the reference line is angled 22.25°. Also, a line 'e' and a line 'f' indicate brightness distribution when the pyramidal diffusing elements 120a and 120b are rotated so that an edge of the diffusing element facing the reference line is angled 22.25°, and arrayed symmetrically.

As shown in FIG. 10, the pyramidal diffusing elements, when rotated so that an edge of the diffusing element facing the reference line is angled 10° to 35°, ensure substantially the same or higher brightness at a front visual angle than in a case where the light guide plate with hemispherical diffusing elements thereon, the diffusing sheet and the prism sheet are employed as in the line 'a', and in a case where the light guide plate with the pyramidal diffusing elements arrayed at a rotation angle of 0°, the diffusing sheet and the horizontal prism sheet are adopted as in the line 'b', respectively.

Accordingly, the pyramidal diffusing elements, when rotated so that an edge of the diffusing element facing the reference line is angled 10° to 35° assure the same or higher brightness even without employing the diffusing sheet and the prism sheet as in the prior art.

Moreover, as shown in FIG. 10, when it comes to a radiation angle which is ½ of the maximum value of brightness measured, it is found widest in the case of adopting the pyramidal elements of the invention. That is, the radiation angle is about ±20° when hemispherical diffusing elements are employed, about ±30° when pyramidal diffusing elements are arrayed at a rotation angle of 0° and ±40° when the pyramidal diffusing elements are rotated so that an edge of the diffusing element facing the reference line is angled 10° to 35° about the reference line.

In consequence, only light exiting from the light guide plate of the invention achieves higher brightness at a broader visual angle than in a case where the diffusing sheet and prism sheets are used together with the light guide plate.

Figure 11:
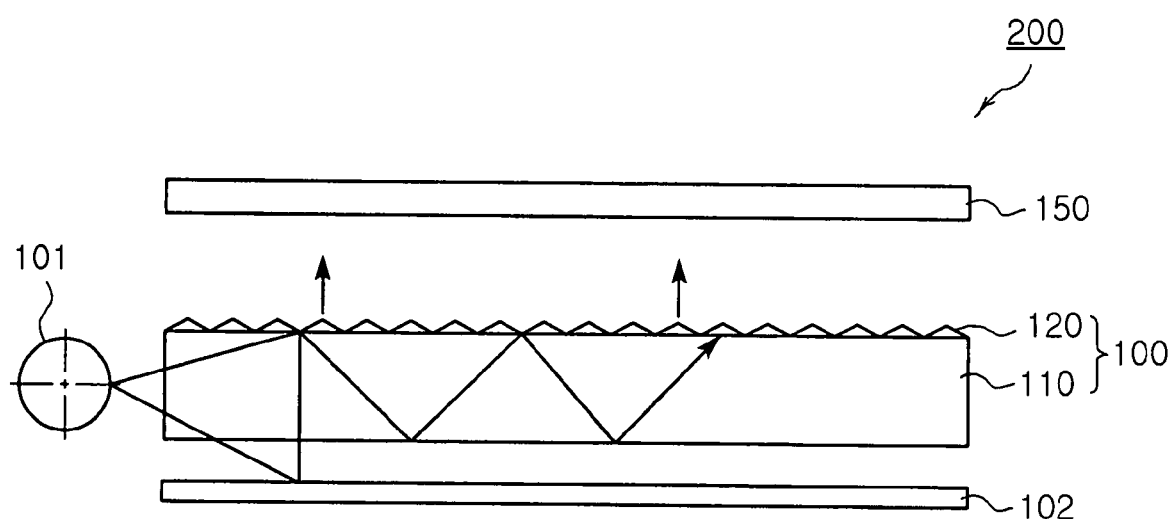
FIG. 11 is a configuration view illustrating a liquid crystal display device employing a light guide plate according to the invention.

As described above, according to the invention, the light guide plate 100 has the diffusing elements 120 which are rotated clockwise or counterclockwise so that an edge of the diffusing element facing the reference line O is angled 10° to 35° about the reference line O, or arrayed symmetrically about the reference line O. Such a light guide plate 100, when applied to the liquid crystal display device 100, realizes a thin liquid crystal display device 200 as shown in FIG. 11. The liquid crystal display device 200 includes a light source 101 at a side of the light guide plate 100, a liquid crystal panel 150 disposed over the light guide plate 100 and a reflective sheet 102 disposed under the light guide plate 100. Here, however, the liquid crystal display device 200 is not provided with the diffusing sheet and prism sheet.

Figure 12:
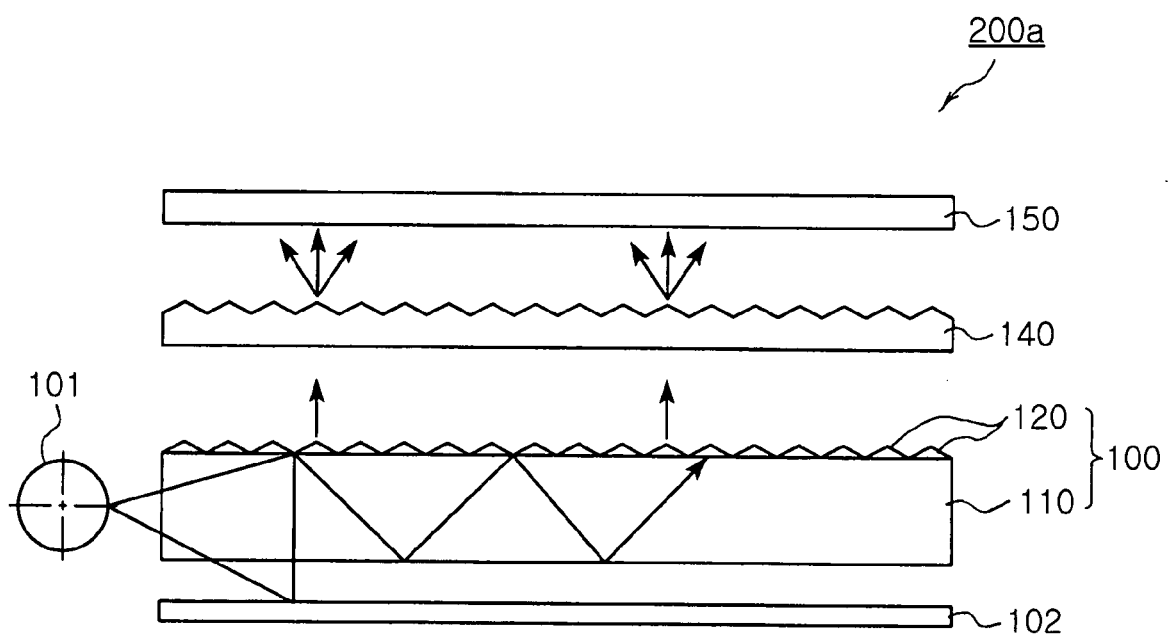
FIG. 12 is a configuration view illustrating a liquid crystal display device employing a light guide plate according to another embodiment of the invention.
Figure 13:
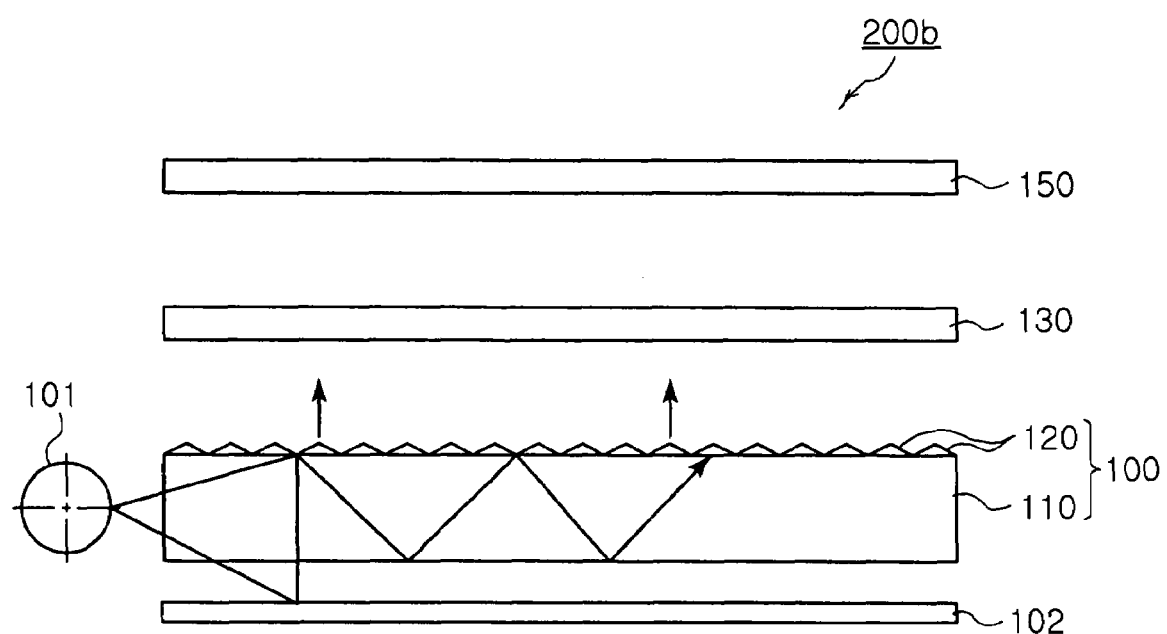
FIG. 13 is a configuration view illustrating a liquid crystal display device employing a light guide plate according to further another embodiment of the invention.

Furthermore, as shown in FIGS. 12 and 13, alterative types of a liquid crystal display device 200a and 200b can be achieved, in which the diffusing sheet 130 or prism sheet 140 is optionally disposed between the light guide plate 100 and the liquid crystal panel 150 to further boost light brightness.

As set forth above, according to exemplary embodiments of the invention, diffusing elements are formed on a surface of a light guide plate, and rotated clockwise or counterclockwise so that an edge of the diffusing element facing a reference line is angled 10° to 35° about the reference line. Accordingly, light incident on the diffusing elements suffers less loss when reflected from the diffusing elements and traveling sideward. Meanwhile, more light can travel toward a front visual angle. This assures brightness the same or higher than the prior art even without use of a diffusing sheet and prism sheet.

As just described, brightness the same or higher than the prior art can be attained without interposing the diffusing sheet and prism sheet between the light guide plate and the liquid crystal panel. This reduces thickness and volume of the device, and the number of parts and assembling processes, thereby saving manufacturing costs.

While the present invention has been shown and described in connection with the preferred embodiments, it will be apparent to those skilled in the art that modifications and variations can be made without departing from the spirit and scope of the invention as defined by the appended claims.

What is claimed is:

1. A light guide plate disposed upstream of a liquid crystal panel to refract light supplied through an edge thereof, toward the liquid crystal panel, the light guide plate comprising:
   a plate body disposed at a side of a light source for supplying light when a supply voltage is applied;
   a plurality of pyramidal diffusing elements arrayed in a predetermined pattern on a surface of the plate body,
   wherein each of the diffusing elements is rotated clockwise or counterclockwise about an axis extending through a vertex of the diffusing element perpendicularly to the surface of the plate body so that an edge of the diffusing element facing a reference line connecting a central point of the light source to a central point of the plate body is angled 10° to 35° about the reference line,
   wherein the diffusing elements are rotated in opposite directions along the reference line and arrayed symmetrically about the reference line.

2. The light guide plate according to claim 1, wherein the diffusing elements define depressions in an outer surface of the plate body which is parallel to the liquid crystal panel.

3. The light guide plate according to claim 1, wherein the diffusing elements define protrusions in an outer surface of the plate body which is parallel to the liquid crystal panel.

4. The light guide plate according to claim 1, wherein the diffusing elements are arranged in a staggered relation.

5. A liquid crystal display device comprising:
   at least one light source for generating light when a supply voltage is applied;
   a light guide plate including a plurality of pyramidal diffusing elements arrayed in a predetermined pattern on a surface of the plate body,
   wherein each of the diffusing elements is rotated clockwise or counterclockwise about an axis extending through a vertex of the diffusing element perpendicularly to the surface of the plate body so that an edge of the diffusing element facing a reference line connecting a central point of the light source to a central point of the plate body is angled 10° to 35° about the reference line,
   a reflective sheet disposed under the light guide plate to reflect light leaked from the light guide plate; and
   a liquid crystal panel disposed over the light guide plate,
   wherein the diffusing elements are rotated in opposite directions along the reference line and arrayed symmetrically about the reference line.

6. The liquid crystal display device according to claim 5, further comprising at least one diffusing sheet interposed between the light guide plate and the liquid crystal panel.

7. The liquid crystal display device according to claim 5, further comprising at least one prism sheet interposed between the light guide plate and the liquid crystal panel.

8. The liquid crystal display device according to claim 5, wherein the diffusing elements define depressions in an outer surface of the plate body which is parallel to the liquid crystal panel.

9. The liquid crystal display device according to claim 5, wherein the diffusing elements define protrusions in an outer surface of the plate body which is parallel to the liquid crystal panel.

10. The liquid crystal display device according to claim 5, wherein the diffusing elements are arranged in a staggered relation.

11. The liquid crystal display device according to claim 5, wherein the light source comprises at least one light source provided integrally to an edge of the plate body.

12. The liquid crystal display device according to claim 5, wherein the light source comprises at least one light source provided separately from an edge of the plate body.

13. The liquid crystal display device according to claim 1, wherein the diffusing elements comprises a first group of diffusing elements being rotated in the clockwise direction at an angle of 10° to 35° about the reference line and a second group of diffusing elements being rotated in the counter-clockwise direction at an angle of 10° to 35° about the reference line, and the first group of diffusing elements and the second group of diffusing elements are symmetrically arrayed with each other with respect to the reference line.

* * * * *